US005790975A

United States Patent [19]
Kashiwazaki et al.

[11] Patent Number: 5,790,975
[45] Date of Patent: Aug. 4, 1998

[54] ONBOARD NAVIGATIONAL SYSTEM

[75] Inventors: Takashi Kashiwazaki; Morio Araki; Satoshi Odagawa; Atsuhiko Fukushima; Kazuhiro Akiyama, all of Kawagoe, Japan

[73] Assignee: Pioneer Electronic Corporation, Japan

[21] Appl. No.: 848,384

[22] Filed: May 8, 1997

Related U.S. Application Data

[63] Continuation of Ser. No. 593,595, Jan. 29, 1996, abandoned, which is a continuation of Ser. No. 866,082, Apr. 3, 1992, abandoned, which is a continuation of Ser. No. 603,300, Oct. 25, 1990, abandoned.

[30] Foreign Application Priority Data

Dec. 13, 1989  [JP]  Japan ................... 1-323548

[51] Int. Cl.$^6$ ............................................. G06F 165/00
[52] U.S. Cl. .................. 701/208; 701/200; 340/990; 340/995
[58] Field of Search ........................ 701/200, 208, 701/212; 340/990, 995

[56] References Cited

U.S. PATENT DOCUMENTS

| | | | |
|---|---|---|---|
| 4,400,780 | 8/1983 | Nagao et al. | 364/449 |
| 4,502,123 | 2/1985 | Minami et al. | 364/449 X |
| 4,513,377 | 4/1985 | Hosebe et al. | 364/449 |
| 4,543,572 | 9/1985 | Tanaka et al. | 364/449 X |
| 4,550,317 | 10/1985 | Moriyama et al. | 364/449 X |
| 4,571,684 | 2/1986 | Takanabe et al. | 364/449 |
| 4,602,251 | 7/1986 | Sawada et al. | 340/995 X |
| 4,630,065 | 12/1986 | Ichikawa | 340/995 |
| 4,660,037 | 4/1987 | Nakamura | 340/990 |
| 4,758,959 | 7/1988 | Thoone et al. | 364/449 C |
| 4,815,012 | 3/1989 | Feintuch | 340/995 X |
| 4,845,631 | 7/1989 | Bottorf | 340/995 X |
| 4,849,827 | 7/1989 | Hashimoto et al. | 364/449 X |
| 4,873,513 | 10/1989 | Soults et al. | 340/995 X |
| 4,876,651 | 10/1989 | Dawson et al. | 364/449 |
| 4,878,170 | 10/1989 | Zeevi | 364/449 |
| 4,937,572 | 6/1990 | Yamada et al. | 364/449 X |
| 4,982,332 | 1/1991 | Saito et al. | 364/449 |
| 5,157,614 | 10/1992 | Kashiwazaki et al. | 364/443 |

OTHER PUBLICATIONS

"Washington, D.C., and Vicinity Street Map", copyright 1984 by ADC, ADC stock No. 30100.
"Map Storage on CD-ROM," Donald F. Cooke, BYTE, Jul. 1987, pp. 129–138.

Primary Examiner—Vincent N. Trans
Attorney, Agent, or Firm—Evenson, McKeown, Edwards & Lenahan, P.L.L.C.

[57] ABSTRACT

An onboard navigation system detects a condition that a recognized present position of the vehicle belongs to a map of a peripheral part of a region covered by map data groups recorded on a recording disc. If a changer type driver is used as a player for reproducing map data, the recording disc being played is changed to a new disc in response to the detection of the above described condition. If a single driver is used, identification information of a corresponding disc is displayed. With these features, the disc being played is quickly changed to a required new disc.

4 Claims, 5 Drawing Sheets

FIG.5
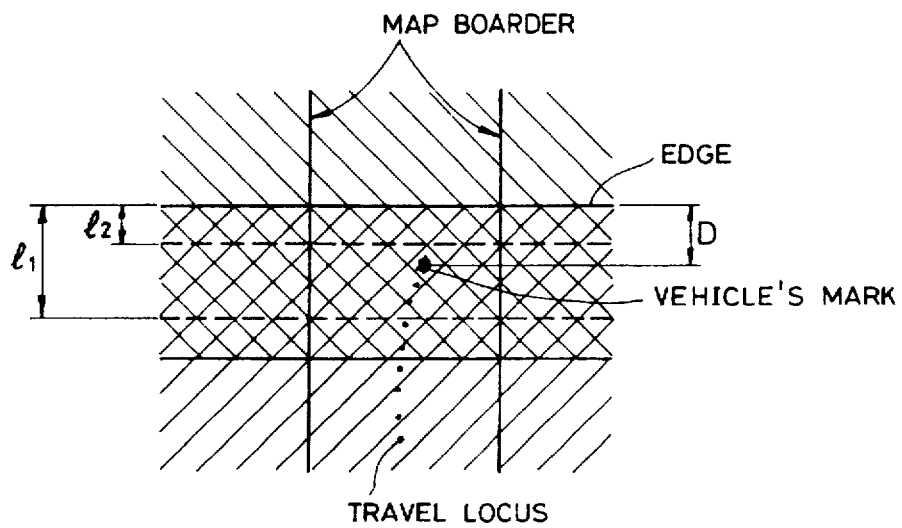
 DISC A   DISC B
FIG.6
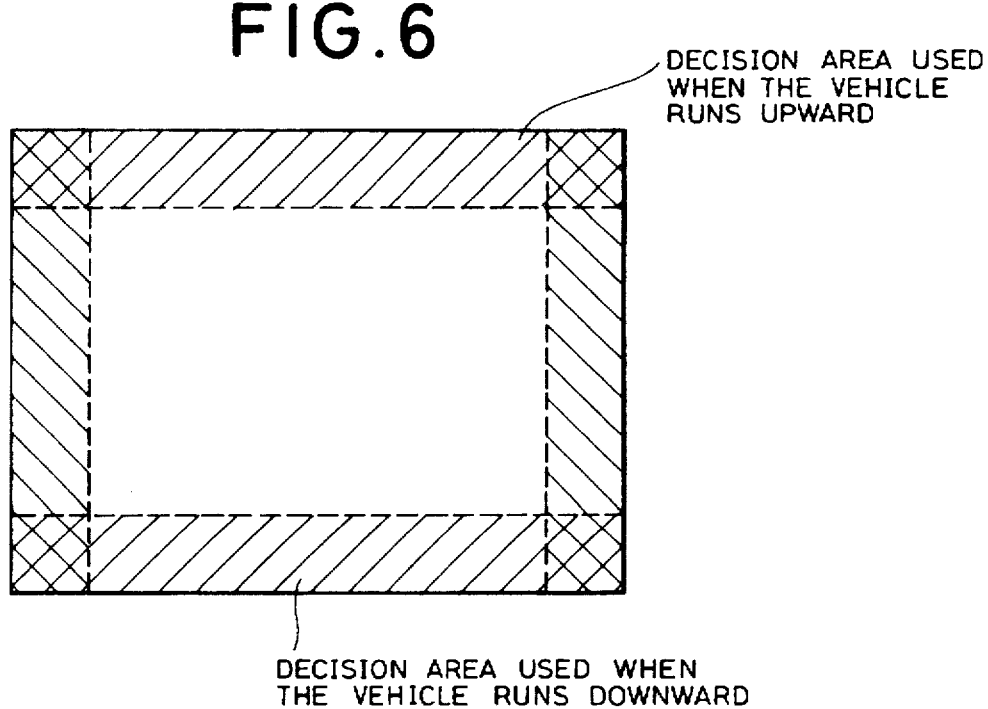

ONBOARD NAVIGATIONAL SYSTEM

This is a continuation of application Ser. No. 08/593,595, filed Jan. 29, 1996, abandoned, which is a continuation of application Ser. No. 07/866,082, filed Apr. 3, 1992, abandoned, which is a continuation of application Ser. No. 07/603,300, filed Oct. 25, 1990, abandoned.

BACKGROUND OF THE INVENTION

1. Field of the Invention

The present invention relates to an onboard (mounted in a vehicle) navigation system.

2. Description of Background Information

Recently, navigation systems to be mounted in a vehicle have been developed and are entering into a stage of practical application. Those navigation systems are constructed such that digitized map data is previously stored in a memory, map data of a region covering a given area including the present position of the vehicle is read out from the memory while the present position of the vehicle is being recognized, so that a map around the position of the vehicle is displayed on a display, and a "vehicle's position" indicating the present position of the vehicle is automatically indicated in the map being displayed.

In such onboard navigation systems, map data of a new area and accordingly the reading of the map data are required successively, every time the vehicle has traveled a predetermined distance. In such a case, it is desirable that the recording medium being played is quickly changed to a recording medium on which necessary map data is recorded.

OBJECT AND SUMMARY OF THE INVENTION

An object of the present invention is to provide an onboard navigation system which is capable of quickly changing the recording medium being played to a recording medium on which necessary map data is recorded, when the reading of the map data is required.

An onboard navigation system according to the present invention comprises: playing means for selectively playing one of a plurality of recording media on each of which a plurality of map data groups respectively corresponding to a plurality of regions are recorded, in which a map data group of a region constituting a peripheral portion of a total recorded region is recorded with identification information of a recording medium carrying map data of regions neighboring the peripheral portion, and in response to a recording medium changing command, changing a recording medium being played to a recording medium corresponding to supplied identification information, and playing recording positions corresponding to supplied recording position information; present position recognition means for recognizing a present position of the vehicle; map data read control means for supplying, on the basis of information of a recognized present position obtained by the present position recognition means, identification information of a recording medium for maps on which map data groups of regions to be retrieved are recorded, and information of recording positions of the map data groups, to the playing means, and for reading map data groups issued from the playing means; display control means for supplying map data groups retrieved by the map data read control means to a display unit, and for controlling the display unit to display a map around the present position of the vehicle; and detecting means for detecting that the recognized present position recognized by the present position recognition means belongs to a peripheral region, wherein the map data read control means issues the recording medium changing command and the identification information to the playing means in response to a detection output signal from the detecting means.

According to another aspect of the invention an onboard navigation system comprises: playing means for selectively playing one of a plurality of recording media on each of which a plurality of map data groups respectively corresponding to a plurality of regions are recorded, in which a map data group of a region constituting a peripheral portion of a total recorded region is recorded with identification information of a recording medium carrying map data of regions neighboring the peripheral portion; present position recognition means for recognizing a present position of the vehicle; map data read control means for supplying, on the basis of information of a recognized present position obtained by the present position recognition means, identification information of a recording medium for maps on which map data groups of regions to be retrieved are recorded, and information of recording positions of the map data groups, to the playing means, and for reading map data groups issued from the playing means; display control means for supplying map data groups retrieved by the map data read control means to a display unit, and for controlling the display unit to display a map around the present position of the vehicle; and detecting means for detecting that the recognized present position recognized by the present position recognition means belongs to a peripheral region, wherein the map data read control means supplies the identification information to the display unit in response to a detection output signal from the detecting means.

In the case of the onboard navigation system according to the present invention, one of a plurality of recording media for maps is arbitrarily selected and played by a driver having a changer function, and the recording medium being played is changed to a recording medium on which neighboring regions are recorded, when it is detected that a recognized present position belongs to a peripheral region.

In the onboard navigation system according to another aspect of the present invention, when a recording medium of maps is played by a single driver, identification information of a recording medium on which regions neighboring the peripheral region are recorded is displayed when it is detected that the recognized present position belongs to a peripheral region.

BRIEF DESCRIPTION OF THE DRAWINGS

FIG. 5 is a diagram showing a relationship between the distance from the present position to a periphery and first and second decision values $l_1$ and $l_2$; and FIG. 6 is a diagram showing a state in which the decision value is a single fixed value.

DETAILED DESCRIPTION OF A PREFERRED EMBODIMENT

The embodiment of the present invention will be explained in detail hereinafter with reference to the accompanying drawings.

Figure 1:
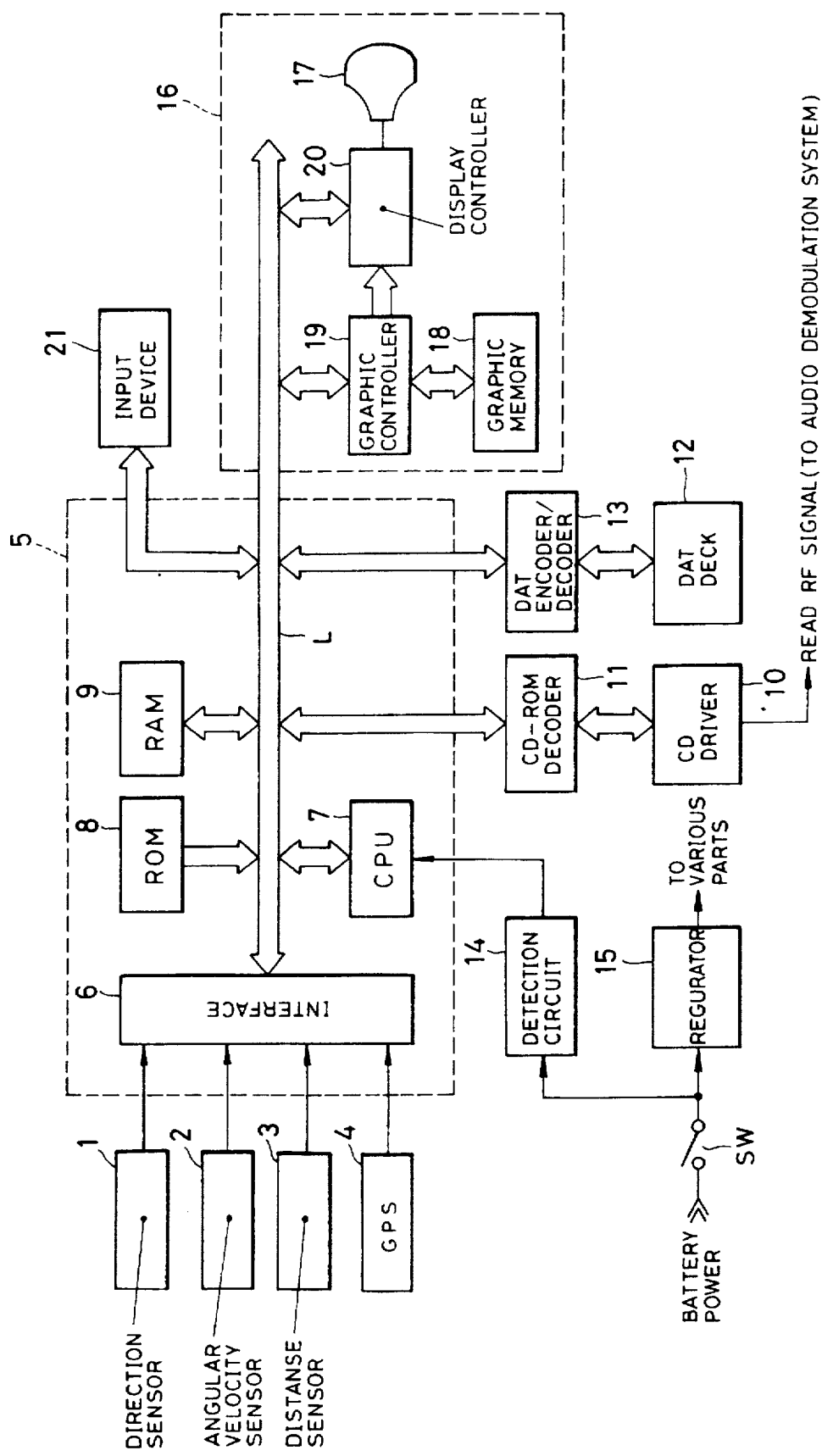
FIG. 1 is a block diagram showing an onboard navigation system according to the present invention.

FIG. 1 is a block diagram showing an example of the construction of the onboard navigation system according to the present invention. In the figure, the numeral 1 denotes a direction sensor which detects the vehicle's traveling direction (the direction in which the vehicle travels) on the basis of the terrestrial magnetism (magnetic field of the earth), for example. The reference numeral 2 denotes an angular velocity sensor for sensing an angular velocity of the vehicle. The reference numeral 3 denotes a distance sensor for sensing the traveling distance of the vehicle, and the reference numeral 4 denotes a GPS (Global Positioning System) for detecting the present position of the vehicle from longitudinal and latitudinal information, etc. Detection outputs of these sensors and systems are supplied to a system controller 5.

The system controller 5 is made up of the following various elements. Namely, an interface 6 receives the detection outputs from the sensors (or system) 1 through 4 and performs processes such as an A/D (Analog to Digital) conversion. A CPU (Central Processing Unit) 7 performs the calculation of the traveling distance of vehicle and the traveling direction of the vehicle, coordinates (longitude and latitude) of the present position, and so on, on the basis of output data of the sensors (or the system) 1 through 4 supplied from the interface 6 sequentially. A ROM (Read Only Memory) 8 stores various processing programs of the CPU 7 and other necessary information beforehand, and a RAM (Random Access Memory) 8 stores information necessary for executing programs and allows both writing and reading of such information.

As an external memory device, the system is provided with a CD-(Compact Disc) ROM and a DAT (Digital Audio Tape) for example, the former operating as a read-only non-volatile storage medium and the latter operating as a nonvolatile storage medium allowing both writing and reading. Furthermore, a nonvolatile storage medium such as an IC card can be used in place of the CD-ROM or the DAT as the external memory device. Map data obtained by digitizing (expressing in the numerical form) each point on roads of a map is previously stored in the CD-ROM, as a map data group including a plurality of map data respectively corresponding to a plurality of areas.

The information recorded on the CD-ROM is read-out by a CD driver 10 which is provided with a disc changer for housing a plurality of discs and loading a selected one of the discs into a playing position. Not only playing of ROM discs for recording map data, the CD driver 10 is also capable of playing ordinary discs for recording music programs.

As the CD driver 10 with a disc changer, a multiple disc player disclosed in Japanese Patent Provisional Publication No. P61-261851 may suitably be used. This CD driver 10 is constructed to change the disc to a disc designated by the disc identification information in response to a disc change command which is generated in the driver 10 or supplied from the system controller 5, and to reproduce data in a recording position designated by recording position information supplied thereto. Furthermore, the CD driver 10 supplies to the system controller 5 status information representing the state of the operation thereof, such as information indicating that the whole Table of Contents (TOC) has been read, the number of the loaded disc, a result of detection whether the loaded disc is a map data disc or a music program disc, information indicating that a music program is being played, or indicating that a no signal section between music programs or between chapters is being played, and information of the track number.

A read output signal of the CD driver 10, obtained when a ROM disc recording a map data is played, is decoded by a CD-ROM decoder 11, and in turn transmitted to a bus line L. On the other hand, the read output signal obtained during the playing of a music program disc is supplied to an audio demodulation unit (not illustrated).

On the other hand, the DAT is used as a so-called backup memory, and recording and reading of information is performed by a DAT deck 12. When the power of the vehicle is turned off, information such as the coordinate of the present position of the vehicle stored in the RAM 9 immediately before is supplied, as backup data, to the DAT deck 12 through a DAT encoder/decoder 13. Upon throw-in of the power of the vehicle, the information stored on the DAT is read out by the DAT deck 12, and transmitted to the bus line L through the DAT encoder/decoder 13 so that the information read out is stored in the RAM 9.

On and off state of the power of the vehicle is monitored by means of a detection circuit 14 which monitors the output level of the so-called accessory switch SW of the vehicle. The vehicle power from a storage battery (not shown) passed through the accessory switch SW is stabilized by means of a regulator 15 and supplied as an electric power of various parts of the apparatus. Owing to the time constant of the circuit, the output signal of the regulator 15 will not fall immediately. During the last transition period, backup data is stored into the DAT operating as the backup memory.

In response to a timer interrupt, the CPU 7 calculates, when the vehicle is running, the direction of the vehicle's movement on the basis of the output data of the direction sensor 1. At the same time, in response to an interrupt generated every time the vehicle travels a predetermined distance on the basis of the output signal of the distance sensor 3, the CPU 7 determines the coordinates of the present position of the vehicle on the basis of the traveled distance and the traveling direction of the vehicle. Then the CPU 7 gathers map data of a region covering a given area including the coordinates of the present position from the CD-ROM, and stores the gathered data in the RAM 9 operating as buffer memory, and also supplies them to a display unit 16. As the method for detecting the traveling direction of the vehicle on the basis of the output signal of the direction sensor 1, a method disclosed in Japanese Patent Provisional Publication No. 62-130013 may be used.

The display unit 16 is made up of a display 17 such as a CRT, a graphic memory 18 made up of a V(Video)-RAM for example, a graphic controller 19 which draws the map data supplied from the system controller 5 in the graphic memory 18 as image data and also outputs this image data, and a display controller 20 which performs control operations to display a map on the CRT display 17 on the basis of image data issued from the graphic controller 19. An input device 21 comprising a keyboard including various keys such as a scale key for designating a scale for the display of a map, and a destination setting key for setting a destination, and so on, is provided, so that various commands are supplied to the system controller 5 in accordance with the key entry by a user.

The structure of the ROM disc for map data will be explained by way of an example in which maps in Japan are recorded.

The contents of one ROM disc are, namely, a disc label, information for the management of maps, parameters for drawing pictures, navigation programs, information for the management of each map, unit data, and additional information. The maps are constituted by a whole country map, regional maps, and detailed maps, whose levels of expression of details are mutually different. One ROM disc contains the whole country map, regional maps covering the whole country, and detailed maps of a part of regions. Among a plurality of detailed maps stored, maps corresponding to a peripheral portion (circumferential portion) are provided with peripheral map information indicating that the map is a peripheral map and an identification number (a volume number) of a disc on which a map data group of a neighboring region is recorded, as the map management information. The disc label is recorded in 2 seconds 16 sectors in the CD-ROM format, and whose contents include system identification information for designating the hardware to be used, program identification information for representing the sort of the program, and a volume number functioning as identification information which is particular for each disc.

Then, the operation of the system having the construction described above at the time of the throw-in of the power current will be explained as follows.

Upon throw-in of the power current, the CDV driver 10 having the disc changer operation reads TOC information of each of a plurality of discs housed in the disc magazine, and in turn stores the read information. This TOC information is held unless the disc magazine is changed. By the reading of the TOC information, the determination of the discs recording map data and discs for music programs.

Upon the throw-in of the power current, the CPU 7 of the system controller 5 performs operations for checking connected devices, for example, operations for checking the memory, and the internal I/O, and the connection of the GPS driver, whether or not the CD driver has the disc changer operation, and checking the input device. If it is judged that the CD driver 10 with the disc changer function is connected, the CPU 7 gets the TOC information of each disc. If the map disc is contained, the CPU 7 reads the disc label and checks the system identification information, then it determines the disc available as a map disc only for discs whose system identification information coincides with that of the present system. With respect to the discs judged to be available as the map disc, program identification information and the volume number are stored in the RAM 9, and the CPU 7 checks the program identification items of each disc. If discs having different program identification information are mixed, the CPU 7 judges whether or not the disc magazine has been changed, by determining if the status information of the CD driver 10 is different from the corresponding information obtained when the power is turned off. If the disc magazine has not been changed, the CPU 7 loads the programs of the disc used last time, and passes the control to the loaded program. If, on the other hand, the disc magazine has been changed, the CPU 7 performs control operations to display, in the display unit 17, application identification information of each disc such as "Do you wish to play games ? or navigate?", and waits the user's selection. Then the CPU 7 loads programs from discs of the selected application identification information, and passes the control to the loaded program.

Figure 2:
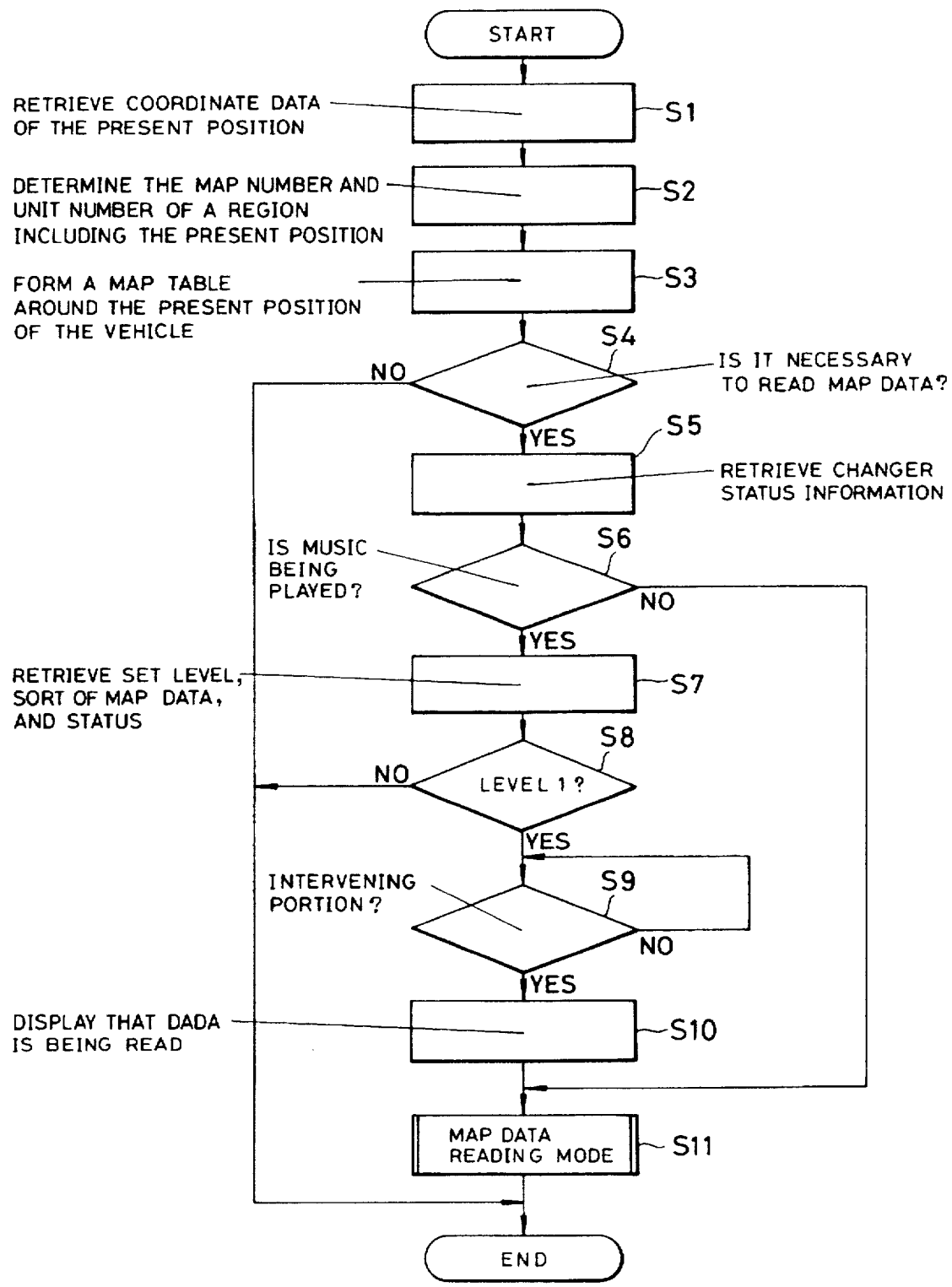
FIG. 2 is a flowchart showing the procedure of a process for renewing map data.

The procedure for renewing the map data performed by the CPU 7 when the system is started with the application of the map disc will be explained with reference to the flowchart of FIG. 2.

At first, the CPU 7 retrieves position coordinate data ($x_0$, $y_0$) of the present position which is derived by the recognition of the present position of the vehicle (step S1), and determines the map number of a region of a given area centered on the present position and the unit number for each scale (step S2), to form a map table about the present position of the vehicle (step S3). In the map table, the value of a degree of necessity (arranged in order according to an estimated time lapse to a instant at which the map will become necessary) is always renewed on the basis of the relation between the present position and the position of the unit. The contents of the map table around the present position of the vehicle are, the disc number (volume number), a map code, a unit code, a necessity code, and a load flag (transmission completion flag).

The degree of necessity is judged on the basis of three levels described later, and an appropriate one of the level can be designated by the user.

level 1: the interruption of the reproduction of music sound is not permitted. In the worst case, only one of the direction and traveling locus is displayed.

level 2: the reproduction of the music sound can be interrupted at any time.

GPS level 1: the reproduction of the music sound is not permeated. When the amount of map data to be displayed becomes very small, the map data will retrieved while the reproduction of music sound is interrupted.

When the reading of map data is necessary, the reading is performed on the basis of the degree of necessity determined by using set levels.

After the production of the map data table in step S3, the CPU 7 judges whether or not there is necessary map data which has not yet been read (step S4), and takes the changer status information issued from the CD driver 10 (step S5) when the reading of map data is necessary. From the CD driver 10, the changer status information such as the whole TOC reading completion flag, loaded disc number, identification information of the map disc/ music program disc, music reproduction indication flag, intervening portion reproduction indication flag, and track number.

Subsequently, the CPU 7 judges whether or not a music is being played, by using the changer status information which has been read (step S6). If music is being played, the CPU 7 retrieves the set level of the degree of necessity, the sort of the necessary map data, and the changer status information, which have been described before (step S7). Then the CPU 7 judges the degree of necessity, and monitors the generation of the intervening portion reproduction indication flag when the set level is level 1 (step S9). When the reproduction position enters into the intervening portion, the CPU 7 starts the control operation to display, by the display unit 17, that the retrieval of data is taking place (step S10). At the same time, the CPU transmits to the CD driver 10 the volume number and the address of the necessary disc along with a data read command, so as to proceed to the map data reading mode (step S11). If the set level is level 2, the CPU 7 completes the process of this routine without executing any further operation. If it is judged in step S6 that the music is not being reproduced, the CPU 7 directly proceeds to the step S11.

Furthermore, the display of the reading of data is performed in the following manner. That is, a message information "Loading of Map data is in progress, please wait a moment" is previously stored in the ROM 8 for example, and the message information is retrieved and in turn supplied to the display unit 16 when it is needed. In addition, the operations of this routine are repeatedly executed while the vehicle travels.

Figure 3:
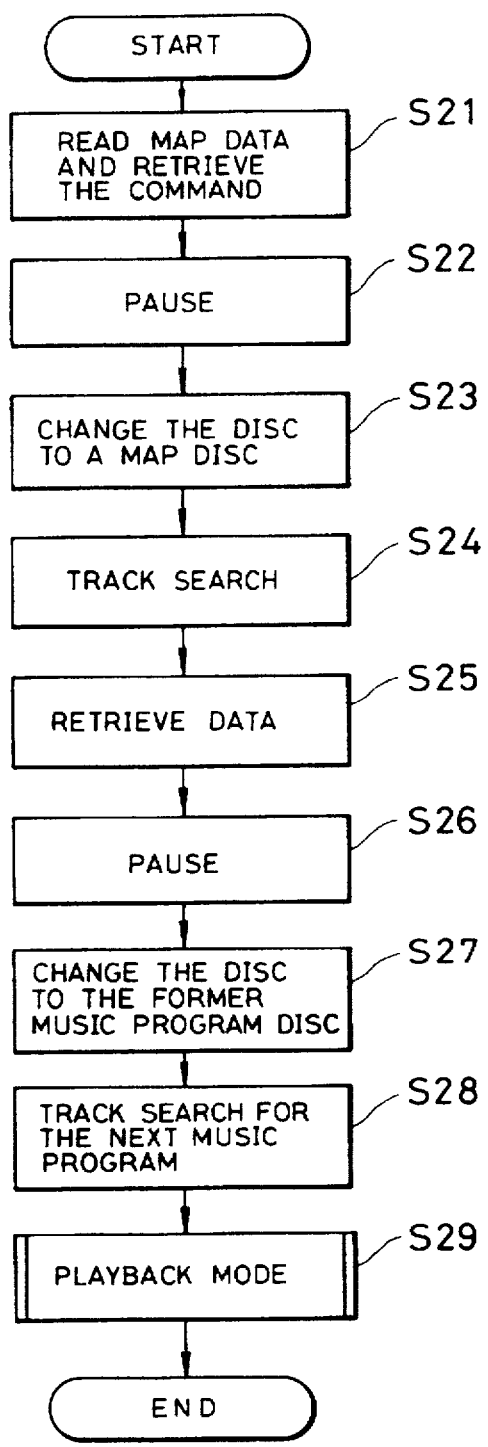
FIG. 3 is a flowchart showing the procedure of a map data reading mode.

In the mode of reading map data (step S11), the reading of map data is executed in the order shown in the flowchart of FIG. 3.

Specifically, the CD driver 10 retrieves the data read command (step S21), and enters into a pause state (step S22). Then, the CD driver 10 changes the disc being played to a map disc corresponding to the designated volume number (step S23). The CD driver 10 searches addresses in which a map data group of the designated map number is recorded (step S24), and read necessary map data (step S25). Then, the CD driver 10 transmits the map data having been read to the system controller 5. After the read of the necessary map data, the CD driver again enters into the pause state (step S26), and changes the disc to the former music program disc (step S27). The CD driver 10 then searches the track of a next music program, and subsequently proceeds to the reproduction mode (step S29).

Figure 4:
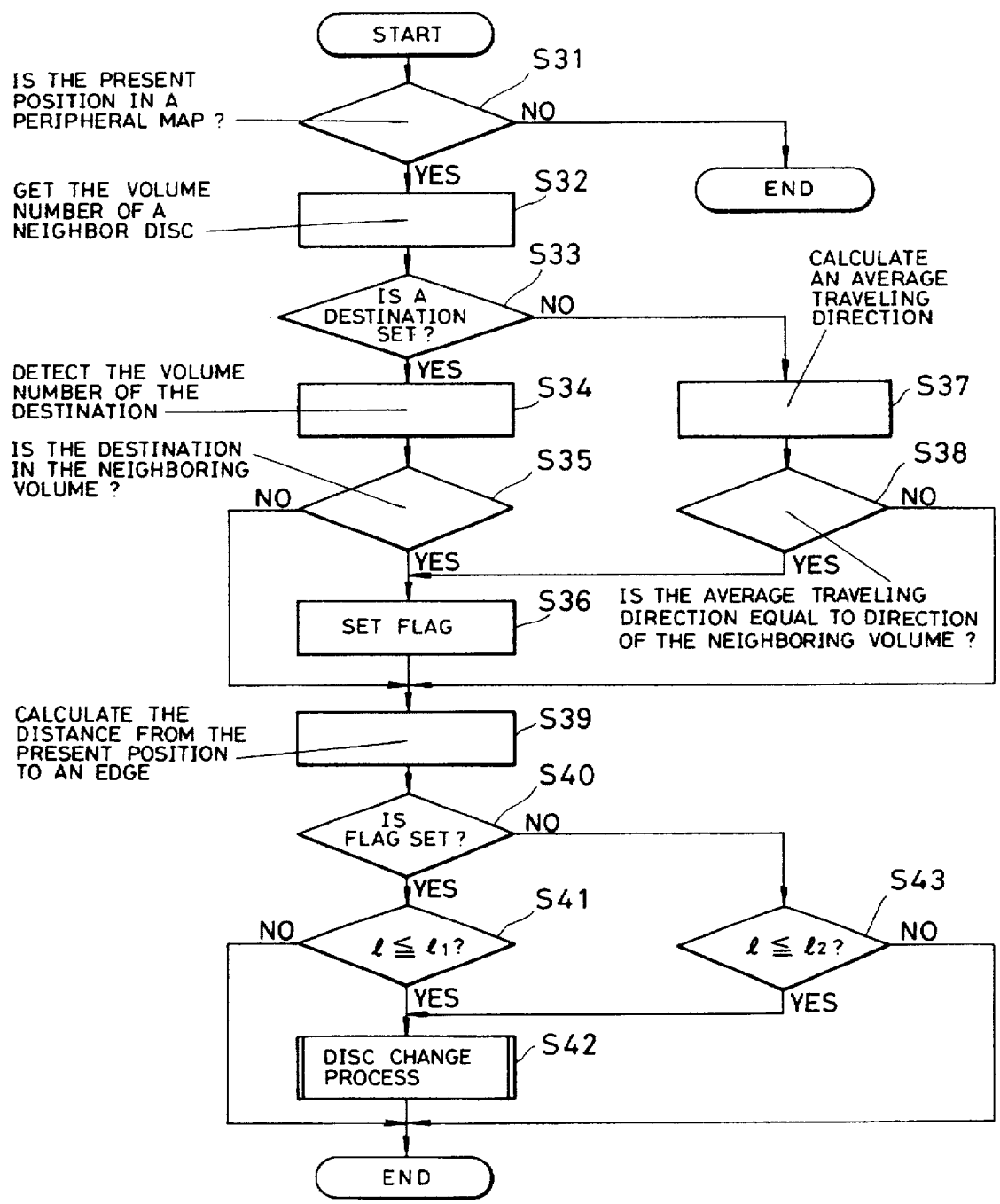
FIG. 4 is a flowchart showing the procedure of a process for changing the disc.

Referring to the flowchart of FIG. 4, an operation for changing the map disc which is performed by the CPU 7 when new map data is required while the vehicle is running in accordance with the traveled distance. It is assumed that detailed maps of regions having a given area and a small-scale general map are stored in a map disc, as described before. Furthermore, discs of two neighboring regions contain an overlap region having a width of one map, for example.

At first, the CPU 7 judges whether or not the map in which the present position is located is a peripheral map in the map table around the present vehicle position which is described before (step S31). As mentioned before, the map management information of the peripheral map includes a peripheral map information, so that a peripheral map can be discriminated by the presence of the peripheral map information. If the map is a peripheral map, the CPU 7 extracts the volume number of the disc on which maps neighboring the map of the present vehicle position are recorded from the map management information and stores it into the RAM 9 (step S32).

Subsequently, the CPU 7 judges whether or not a destination has been set (step S33). If a destination has been set, the CPU 7 detects a volume number to which coordinates of the destination belong (step S34). Then, the CPU 7 judges whether or not the detected volume number is identical with a neighboring volume number (step S35). If the destination is in the neighboring volume number, the CPU 7 sets an identification flag F (step S36). If no destination has been set, the CPU 7 generates an average direction of the vehicle's movement by using an average value of vehicle's traveling direction in a last certain distance to the present position covered by the vehicle (step S37). Then, the CPU 7 judges whether or not the average traveling direction is equal to the direction of the neighboring volume (step S38). If the average traveling direction is directed to the neighboring volume, the program proceeds to step S36, to set the identification flag F.

Then, the CPU 7 calculates the distance l (see FIG. 5) from the present position to an edge (step S39). Then, the CPU 7 judges whether or not the identification flag F is set (step S40). If the identification flag F is set, the CPU 7 judges whether or not the distance l is smaller than a first determination value $l_1$ (step S41). Only when $l \leq l_1$, the CPU 7 transmits, to the CD driver 10, the disc change command and the volume number of the corresponding disc, to execute a process for changing the map disc (step S42). If, conversely, the identification flag F is not set, the CPU 7 judges whether or not the distance l is equal to or smaller than a second decision value $l_2$ which is smaller than the first decision value $l_1$ (step S43). Only when $l \leq l_2$, the program proceeds to step S42, to execute the map disc change process.

Thus, first and second decision values $l_1$ and $l_2$ ($l_1 > l_2$) are set for the comparison of the magnitude of the distance l.

This provision is made to prevent frequent changes of the disc when, as shown in FIG. 5, the vehicle moves along the edge portion while the vehicle is traveling in the region of the disc A toward the region of the disc B. In other words, the probability of the vehicle to enter into the region B is judged, so that the disc is changed in a short period if the probability is high, and the timing of the change is delayed if the probability is low.

Furthermore, as shown in FIG. 6, a hysteresis characteristic can be given by using a single fixed decision value depending on the direction of the vehicle's movement. In this case, a fast speed is required in changing the disc.

For changing the map disc in step S42, the following system call is used. Specifically, the program identification information and the volume number of the disc to be driven are used as parameters. If there is no corresponding disc, or if a CD driver without the changer function is provided, an error is given back. If an error is given back, for example a message "Change of the map disc is required. Replace it with the disc of volume X (version of the region XX)" is displayed in the display unit 17. The display of this message is made while the map data of the present position is present, so that the map can be displayed without interruption, for driving with the navigational aide.

If there is a corresponding disc at the time of the system call, the apparatus newly loads a program from the new disc, and passes the control operation to the loaded program. If no corresponding disc is detected, the navigation program will be executed without any change. In such a case, if the GPS receiver 4 is connected, the vehicle can travel by using the detected longitude and latitude information. If sensors 1 through 3 are connected, the vehicle can travel with the accuracy of those sensors 1 through 3. If both of the GPS receiver 4 and the sensors 1 through 3 are connected, the vehicle can travel in a hybrid mode. If data of a large region map is given, the vehicle can travel while the present position is displayed in the large region map. In other words, the vehicle travels without the so-called map matching operation.

With the feature described above, the navigation operation can be continued by using a disc of another region, even if there is not a disc containing a detailed map of the present position. This mode of operation is also performed when the next intervening portion is not detected for a long period, specifically, if a time period for playing the program from the present playing position to the next intervening portion, which is calculated on the basis of the TOC information, is greater than a predetermined time period, or when the mode of operation is in the level 1 while the music is being played.

In the embodiment described in the foregoing, the operation of the apparatus is explained by way of an example in which a CD driver 10 having the changer function is connected, and the volume number of a disc having neighboring maps and the disc change command are transmitted to the CD driver 10 when it is detected that the recognized present position is located in a peripheral map, so that the disc is automatically replaced with the corresponding map disc. However, if the so-called "single CD driver" is connected, the volume number of the corresponding disc may be displayed on the display unit 17, so as to inform the user of the new disc to be used after the change.

As described specifically in the foregoing, in the onboard navigation apparatus according to the present invention, if a driver having a changer function is connected, the recording medium is automatically changed to a recording medium on which maps of neighboring regions are recorded when it is detected that the recognized present position belongs to a peripheral region. If a single driver is connected, the apparatus is constructed to display the identification information of the new recording medium. Thus, when the reading of map data is required, the recording medium can be changed immediately, by an automatic operation or by the user, to a recording medium on which necessary map data is recorded.

What is claimed is:

1. In a navigation system for use in a vehicle having an operation to display a map using map data read out from a recording medium storing the map data which covers at least one of a plurality of divided areas, said divided areas respectively having a boundary area in which reference lines are provided, the improvement comprising:

identifying means for identifying the vehicle's traveling state including a traveling direction and a current position of said vehicle, and producing an output signal representing the vehicle's traveling state;

determining means for determining among said plurality of divided areas a current area to which said current position of said vehicle belongs, based upon said output signal of said identifying means; and an extracting means for extracting map data of said current area determined by said determining means;

an area change instructing means for instructing a change to a next area to which data to be extracted by said extracting means belongs, when said current position of said vehicle is within said boundary area of said current area connecting to said next area, wherein said reference lines include at least an inner reference line and an outer reference line which are parallel with each other, and said area change instructing means outputs an area change instruction by using said inner reference line when said traveling direction of the vehicle is directed to said next area adjacent to said current area, and by using said outer reference line when said traveling direction of the vehicle is not directed to said next area.

2. A navigation system as claimed in claim 1, further comprising a media changer unit which is capable of sequentially reproducing recorded data of a plurality of recording media, wherein map data of each one of said plurality of areas is recorded in each one of said plurality of recording media, and map data of a boundary area of adjacent two areas of said plurality of areas is recorded in said adjacent two areas in an overlapped manner, said area change instruction is a media change instruction, and wherein said media changer unit exchanges said recording media in response to said media change instruction.

3. In a navigation system for use in a vehicle having an operation to display a map using map data read out from a recording medium storing the map data which covers at least one of a plurality of divided areas, said divided areas respectively having a boundary area in which reference lines are provided, the improvement comprising:

identifying means for identifying the vehicle's traveling state including a traveling direction and a current position of said vehicle, and producing an output signal representing the vehicle's traveling state;

determining means for determining among said plurality of divided areas a current area to which said current position of said vehicle belongs, based upon said output signal of said identifying means;

an extracting means for extracting map data of said current area determined by said determining means;

a destination setting means for setting a destination; and an area change instructing means for instructing a change to a next area to which data to be extracted by said extracting means belongs, wherein said reference lines include at least an inner reference line and an outer reference line which are parallel with each other, and said area change instructing means outputs an area change instruction by using said inner reference line when said destination exists within said next area adjacent to said current area, and by using said outer reference line when said destination exists in an area other than said next area.

4. A navigation system as claimed in claim 3, further comprising a media changer unit which is capable of sequentially reproducing recorded data of a plurality of recording media, wherein map data of each one of said plurality of areas is recorded in each one of said plurality of recording media, and map data of a boundary area of adjacent two areas of said plurality of areas is recorded in said adjacent two areas in an overlapped manner, said area change instruction is a media change instruction, and wherein said media changer unit exchanges said recording media in response to said media change instruction.

* * * * *